United States Patent
Seong et al.

(10) Patent No.: US 6,546,127 B1
(45) Date of Patent: Apr. 8, 2003

(54) SYSTEM AND METHOD FOR REAL TIME THREE-DIMENSIONAL MODEL DISPLAY IN MACHINE TOOL

(75) Inventors: Dae Jung Seong, Seoul (KR); Mi Jin Choi, Kyonggi-do (KR); Jong Tae Kim, Woolsan (KR)

(73) Assignee: Daewoo Heavy Industries Ltd., Incheon (KR)

( * ) Notice: Subject to any disclaimer, the term of this patent is extended or adjusted under 35 U.S.C. 154(b) by 0 days.

(21) Appl. No.: 09/564,640

(22) Filed: May 3, 2000

(30) Foreign Application Priority Data

May 3, 1999 (KR) .................................... 1999-15849

(51) Int. Cl.[7] ................................................. G06K 9/00
(52) U.S. Cl. ...................... 382/152; 318/599; 700/61
(58) Field of Search ....................... 382/152; 702/34; 700/56, 61, 186, 159–195, 302; 318/560–689; 701/1–124; 29/702, 720

(56) References Cited

U.S. PATENT DOCUMENTS

| | | | | |
|---|---|---|---|---|
| 4,639,653 A | * | 1/1987 | Anderson et al. | 318/599 |
| 4,777,603 A | * | 10/1988 | Woodman et al. | 700/159 |
| 4,786,847 A | * | 11/1988 | Daggett et al. | 318/568.2 |
| 4,794,540 A | * | 12/1988 | Gutman et al. | 700/187 |
| 4,876,494 A | * | 10/1989 | Daggett et al. | 318/568.22 |
| 5,025,385 A | * | 6/1991 | Froyd | 700/169 |
| 5,061,886 A | * | 10/1991 | Yamada | 318/565 |
| 5,412,300 A | * | 5/1995 | Meyer et al. | 318/568.11 |
| 5,659,480 A | * | 8/1997 | Anderson et al. | 700/186 |
| 5,926,389 A | | 7/1999 | Trounson | 700/187 |
| 6,356,807 B1 | * | 3/2002 | McGee et al. | 700/253 |

* cited by examiner

Primary Examiner—Samir Ahmed
(74) Attorney, Agent, or Firm—Lowe Hauptman Gilman & Berner, LLP

(57) ABSTRACT

A system for real time three-dimensional model display in a machine tool includes a plurality of motors each capable of providing relative movement between a tool and a workpiece along an associated one of multiple axes, a servo driver for controlling the motors, a numerical controller coupled to the servo driver for transmitting target three-dimensional coordinates of points stored in a memory to the servo driver such that the motors can be caused to move into the target coordinates of points and for receiving actual three-dimensional coordinates of points fed back from the motors, and an image processor for receiving the actual three-dimensional coordinates of points from the numerical controller and for directly transmitting the actual three-dimensional coordinates of points to a display screen, so as to achieve a real time workpiece shape display based on the actual three-dimensional coordinates of points of the motors. Also provided is a method of displaying three-dimensional workpiece shape on a real time basis as the workpiece is cut into a desired shape under the control of the numerical controller.

5 Claims, 3 Drawing Sheets

SYSTEM AND METHOD FOR REAL TIME THREE-DIMENSIONAL MODEL DISPLAY IN MACHINE TOOL

FIELD OF THE INVENTION

The present invention relates generally to a three dimensional model display system for use in a machine tool, and more specifically to a real time three-dimensional workpiece shape display system of the type capable of displaying the shape of a workpiece on a real time basis as the workpiece is cut into a desired shape by a tool.

BACKGROUND OF THE INVENTION

In the field of computerized numerical control systems employed in a machine tool, servo control devices have made remarkable advance with the rapid progress of hardware and software technology in the computer industry. A technique for graphically describing three-dimensional models as well as two-dimensional models has been evolved from a wire frame method in which only the contour of an object is drawn, into a solid method in which the surface of an object is described.

With reference to FIG. 1, there is illustrated a typical three-dimensional display system wherein an electronic hardware utilizes several input and output functions, but performs no active functions in the sense of closing servo loops, as described in U.S. Pat. No. 5,926,389 to James E. Trounson, entitled "computer control system for generating geometric design". An interface card includes up/down counters which accumulate pulses from optical encoders attached to motors, to allow a micro processor to read the position of the motors. In addition, the interface hardware includes counters which are loaded by a central processing unit (CPU), to send a fixed pulse width modulation (PWM) signal to power boards. Another counter within the interface card circuitry is loaded with a value which thereafter causes the card to produce a fixed frequency pulse. A deadman timer on the interface card is periodically loaded by the CPU. In order to sequentially access the respective one of six axes, a pointer latch on the interface card is rippled each time a PWM count is loaded into one of the counters. The output from this pointer latch indicates which one of the six axes is to receive the PWM signal. The amount of input/output (I/O) space required is thereby reduced because all sets of I/O ports are at the same physical address for the CPU, but are individually selected via the pointer latch. With reference to the software architecture diagram of the prior art system referred to above, the software is divided into four distinct tasks. Three of these tasks are invoked periodically through hardware generated interrupt requests which occur at the rates, e.g., 6000 Hz, 60 Hz and 10 Hz. The fourth task is the foreground task which operates whenever no hardware interrupts are pending or active. All of the tasks have access to a common shared memory.

One drawback of the above-mentioned prior art three-dimensional display system is that, in order to display on a display screen the three-dimensional model in a computer incorporating only one microprocessor, the system has to rely upon a computer aided design (CAD) program which is incapable of displaying the present contour of a workpiece on the display screen on a real time basis as the workpiece is cut by a tool.

The prior art three-dimensional display system as set forth above is also disadvantageous in that it requires a huge memory for storage of the CAD program, which would render the system costly and bulky.

It would be thus highly desirable to provide a real time three-dimensional display system for use in a machine tool which eliminates those shortcomings found in the above-noted and other prior art systems.

SUMMARY OF THE INVENTION

With the deficiencies inherent in the prior art taken into account, it is an object of the invention to provide a three-dimensional model display system for use in a machine tool which can display the geometrical shape of a workpiece on a real time basis as the workpiece cutting operation proceeds without resort to any computer aided design program.

Another object of the invention is to provide a three-dimensional model display method which enables the geometrical shape of a workpiece to be displayed to the view of an operator on a real time basis as the workpiece is cut by a tool in a numerical control machine tool.

According to one aspect of the invention, there is provided a system for real time three-dimensional model display for use in a machine tool, comprising: i) a plurality of motors each capable of providing relative movement between a tool and a workpiece along an associated one of multiple axes; ii) servo means for controlling said motors; iii) a numerical controller coupled to said servo means for transmitting target three-dimensional coordinates of points stored in a memory to said servo means such that said motors can be caused to move into the target coordinates of points, and for receiving actual three-dimensional coordinates of points fed back from said motors; and iv) an image processor for receiving the actual three-dimensional coordinates of points from said numerical controller and directly transmitting said actual three-dimensional coordinates of points to a display screen so as to achieve real time workpiece shape display based on the actual three-dimensional coordinates of points.

According to another aspect of the invention, there is provided a method for real time three-dimensional model display in a machine tool, comprising: i) providing a plurality of motors each capable of providing relative movement between a tool and a workpiece along an associated one of multiple axes; ii) providing servo means for controlling said motors; iii) causing a numerical controller to transmit target three-dimensional coordinates of points stored in a memory to said servo means such that said motors can be caused to move into the target coordinates of points, and to receive actual three-dimensional coordinates of points fed back from said motors; and iv) allowing an image processor to receive the actual three-dimensional coordinates of points from said numerical controller and to directly transmit said actual three-dimensional coordinates of points to a display screen so as to achieve a real time workpiece shape display based on the actual three-dimensional coordinates of points.

BRIEF DESCRIPTION OF THE DRAWINGS

Other objects and aspects of the invention will become apparent from the following description of a preferred embodiment with reference to the accompanying drawings, in which.

DETAILED DESCRIPTION OF THE PREFERRED EMBODIMENT

An embodiment of the present invention will now be described with reference to the drawings.

Figure 1:
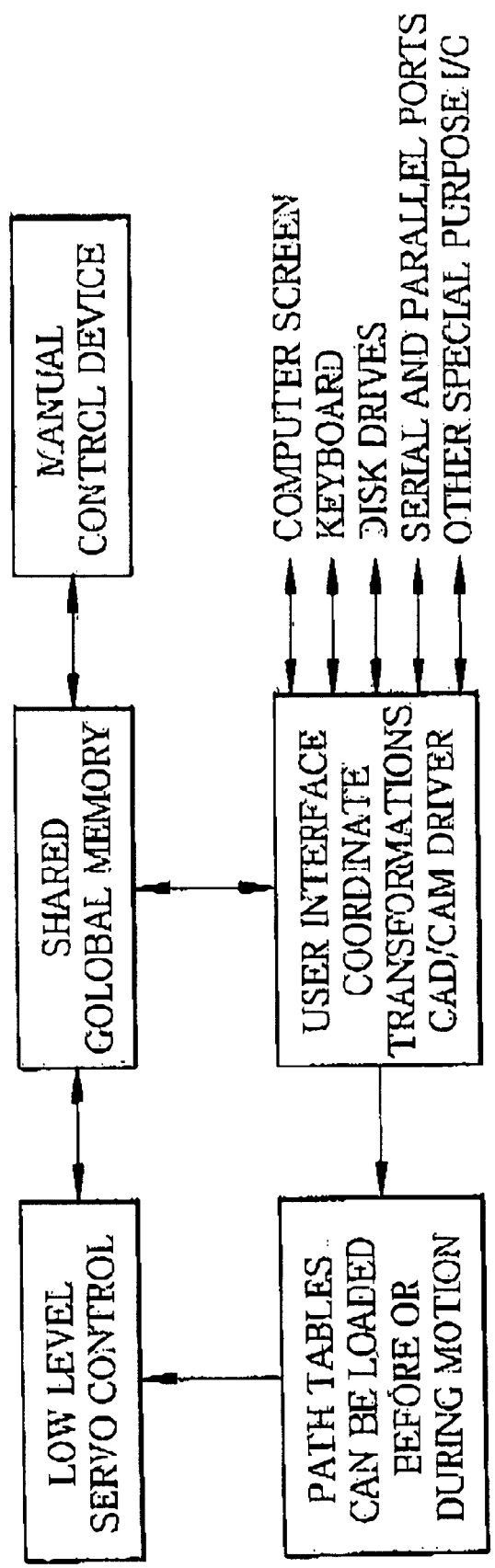
FIG. 1 is a block diagram of the system software architecture for a multiple axes servo control system incorporated in a prior art numerical control machine tool.
Figure 2:
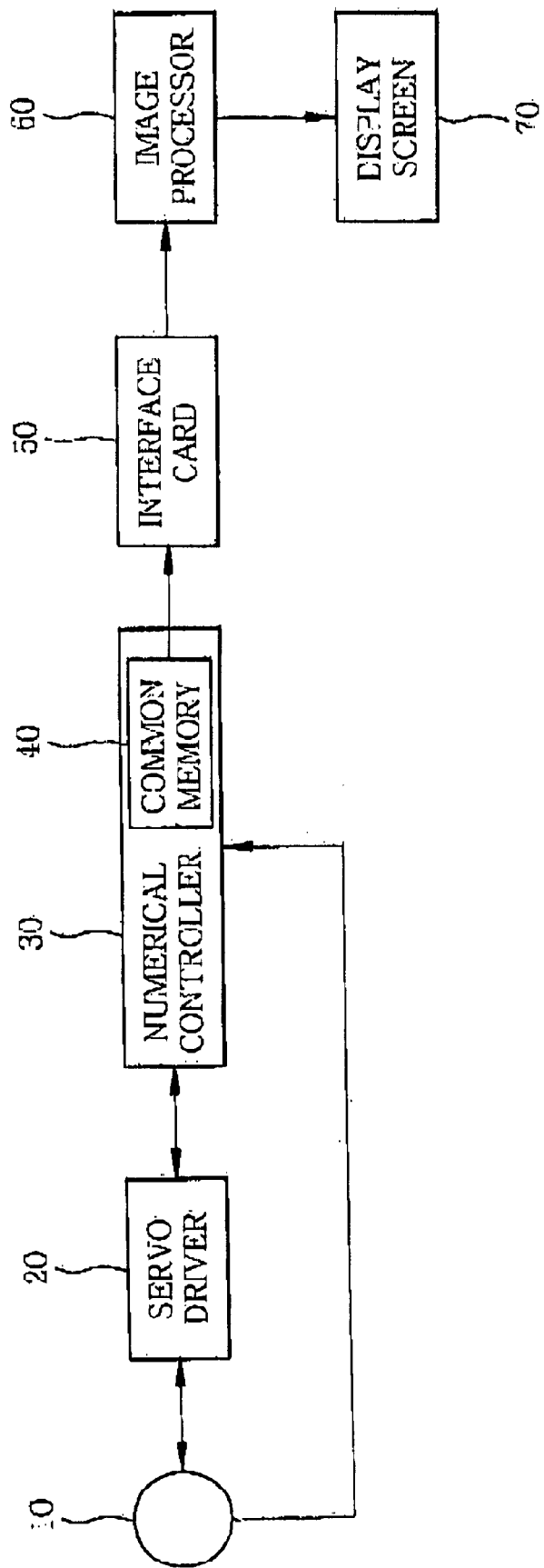
FIG. 2 is a block diagram showing a schematic construction of a real time three-dimensional model display system for use in a machine tool in accordance with the present invention.

Referring to FIG. 2, there is shown a schematic view of a real time three-dimensional model display system according to the present invention, wherein a numerical controller 30 is adapted to control the movement of the entire numerically controlled apparatus based on an object-oriented program stored in a read only memory of the numerical controller 30, instead of a conventional computer aided design program which is usually in the form of an EPROM or EEPROM. Input/output signals and various image data for the real time three-dimensional image processing are stored in the read only memory. A so-called "CMOS" memory backed-up by a battery is used as a nonvolatile memory which can store such parameters as pitch error correction amounts and tool correction amounts even after the power supply is cut off.

The numerical controller 30 is configured to receive commands via a bus, interprets these commands through the use of a sequence program stored in the read only memory and then produces control signals to be used in controlling a machine tool, via an input/output circuit of the numerical controller 30. Moreover, the numerical controller 30 receives such input signals as a limit switch signal and an operation panel switch signal and processes these signals by use of a sequence program. The outcome of the signal processing are transferred to the read only memory contained in the numerical controller 30 via the bus, and are read by the numerical controller 30.

A graphic interface card 50 is utilized to convert digital signals into display signals and then send the display signals through an image processor 60 to a display screen 70. The image processor 60 serves to convert the display signals into real three-dimensional signals, which are to be sent to the display screen 70. As is highly conventional, the display screen 70 comprises a cathode ray tube or a liquid crystal display which can display the geometrical shape of a workpiece as machined. A keyboard can be used for the purpose of inputting various kinds of data needed to operate the machine tool.

A servo driver 20 is configured to receive a positional command from the numerical controller 30 and feed a target positional command signal to the respective one of, e.g., six motors 10 to thereby control movement of the latter in a well-known manner. The motors 10 are connected to the numerical controller 30 which produces feedback position signals indicative of the actual motor position.

These motors 10 are provided in a one-to-one relationship with the corresponding one of the multiple axes in practice, which are not shown in the drawings for simplicity. The actual positional signals thus produced are directly transmitted to the interface card 50 through the numerical controller 30 and then converted to real three-dimensional image signals by means of the image processor 60 so that the three-dimensional workpiece shape can be displayed on the display screen 70 on a real time basis. It should be noted that a dedicated processor can be employed to form a real three-dimensional image on the display screen 70.

The workpiece, one end of which is fixedly held by a chuck, rotates in the direction of C-axis and is shifted in the direction of Z-axis. The tool, however, is moved along a servo axis only in the direction of X-axis. Therefore, the tool shape and the workpiece shape on the display screen 70 are shifted in the direction of X-axis and Z-axis, respectively, in accordance with the machining program. The process of machining the workpiece is displayed on the display screen 70 as a machining simulation. Namely, the tool shape is shifted vertically and the workpiece shape is shifted horizontally on the display screen 70, following the actual movements of the machine tool.

With a view to change the image on the display screen 70, the tool shape is shifted upward in the direction of X-axis, the workpiece shape is moved to the left in the direction of Z-axis, and the tool shape is then shifted downward in the direction of X-axis.

According to the illustrated embodiment, the machining process of the workpiece by the tool is shown as realized by the actual machine tool. This means that the machining can be simulated in a manner that closely resembles the movement of the actual machine tool.

It is difficult, if not impossible, to recognize the workpiece shape when it is rotating in the direction of C-axis on the display screen 70, and therefore, the relationship between the individual servo axes (X-, Z- and C-axis) on the display screen 70 can be displayed with real three-dimensional image through the use of an object-oriented application. This enables the relationship between each servo axis and a shifting object to be easily recognized on the display screen 70 in the form of three-dimensional image.

As stated above, the present invention enables a machining process to be simulated in such a fashion that a tool shape and a workpiece shape are shifted according to the movement of an actual machine tool.

The exemplary workpiece shape display method illustrated in FIG. 30 includes a display routine that operates to cause the numerical controller 30 to control a real-time three-dimensional display coupled thereto at least as a function of the drawing command (process step S16). According to the illustrated embodiment, the drawing command can be directly transmitted to the display screen 70 which may be a windowed display. The windowed display and its advantages in conveying information to an operator in a flexible and intuitively understandable manner are well known. As the actual positional signals from the motors 10 are transmitted to the numerical controller 30, the numerical controller 30 will directly send the received actual positional signals to the interface card 50 and simultaneously feed next target positional signals stored in the memory to the motors 10 (process step S12 and S13) until the machining process comes to an end. In step S14, the numerical controller 30 receives the next target positional data from the object-oriented program stored in the read only memory, and then sends the next target positional data to the servo driver 20 to drive the motors 10 in a controlled manner.

Figure 3:
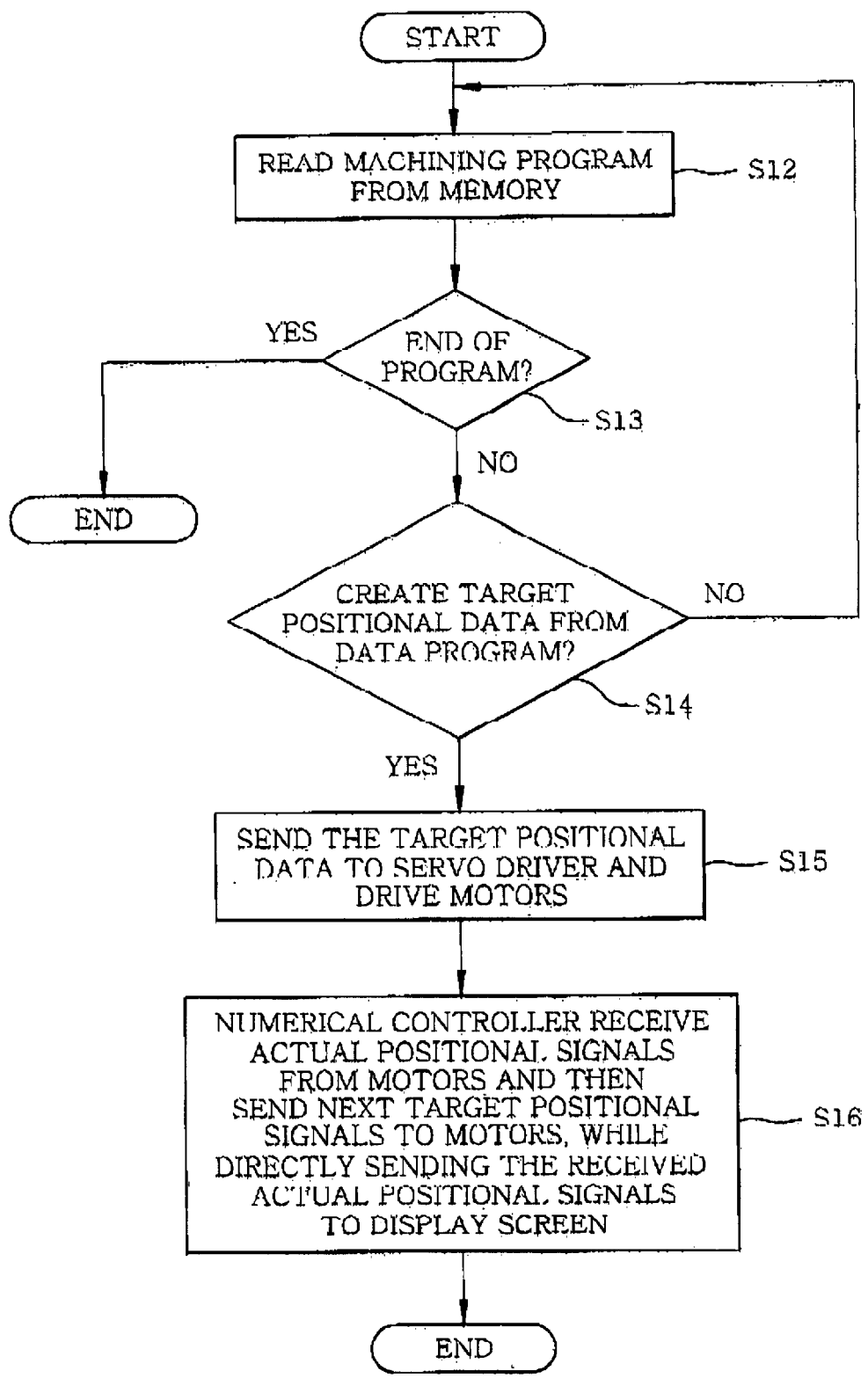
FIG. 3 is a flow chart illustrating a real time three-dimensional model display method in accordance with the present invention.

The method illustrated in FIG. 3 further includes a coordinate mapping routine that operates to cause the image processor 60 to communicate the actual positional signals between the interface card 50 and the image processor 60 as a function of the coordinate pointer (process step S16). According to the illustrated embodiment, the coordinate pointer may suitably correspond to a actual position of the motors 10 in the image processor 60.

It should be appreciated that the coordinate mapping routine allows unilateral communication of signals between the numerical controller 30 and the image processor 60, thereby making it possible to read the actual positional signals from the image processor 60.

Although the present invention and its advantages have been described in detail by way of example, those skilled in the art should understand that they can make various changes, substitutions and alterations herein without departing from the spirit and scope of the invention in its broadest form.

What is claimed is:

1. A system for real time three-dimensional model display for use in a machine tool, comprising:
   i) a plurality of motors each capable of providing relative movement between a tool and a workpiece along an associated one of multiple axes;
   ii) servo means for controlling said motors;
   iii) a numerical controller coupled to said servo means for transmitting target three-dimensional coordinates of points stored in a memory to said servo means such that said motors can be caused to move into the target coordinates of points, and for receiving actual three-dimensional coordinates of points fed back from said motors; and
   iv) an image processor for receiving the actual three-dimensional coordinates of points from said numerical controller and directly transmitting said actual three-dimensional coordinates of points to a display screen so as to achieve real time workpiece shape display based on the actual three-dimensional coordinates of points of said motors.

2. The system as recited in claim 1, wherein said actual three-dimensional coordinates of points are created by means of an object-oriented application.

3. The system as recited in claim 1, further comprising an interface card provided between said numerical controller and said image processor, said interface card adapted to convert said actual three-dimensional coordinates of points to display image data so that said image processor can translate the image data into image pixels.

4. A method for real time three-dimensional model display in a machine tool, comprising:
   i) providing a plurality of motors each capable of providing relative movement between a tool and a workpiece along an associated one of multiple axes;
   ii) providing servo means for controlling said motors;
   iii) causing a numerical controller to transmit target three-dimensional coordinates of points stored in a memory to said servo means such that said motors can be caused to move into the target coordinates of points, and to receive actual three-dimensional coordinates of points fed back from said motors; and
   iv) allowing an image processor to receive the actual three-dimensional coordinates of points from said numerical controller and to directly transmit said actual three-dimensional coordinates of points to a display screen so as to achieve a real time workpiece shape display based on the actual three-dimensional coordinates of points of said motors.

5. The method as recited in claim 4, wherein said actual three-dimensional coordinates of points are created by means of an object-oriented application.

* * * * *